(12) United States Patent
Bünsch et al.

(10) Patent No.: US 6,403,264 B1
(45) Date of Patent: Jun. 11, 2002

(54) LEAD/SULPHURIC ACID-ACCUMULATOR, SEPARATOR FOR LEAD/SULPHURIC ACID ACCUMULATORS AND PROCESS TO REDUCE THE FORMATION OF COLORED DEPOSITS IN A LEAD/SULPHURIC ACID ACCUMULATORS

(75) Inventors: Hellmut Bünsch; Klaus Heinrich Ihmels, both of Hamburg; Frank Otto Theubert, Norderstedt, all of (DE)

(73) Assignee: Daramic, Inc., North Charleston, SC (US)

( * ) Notice: Subject to any disclaimer, the term of this patent is extended or adjusted under 35 U.S.C. 154(b) by 0 days.

(21) Appl. No.: 09/468,180

(22) Filed: Dec. 21, 1999

Related U.S. Application Data

(63) Continuation of application No. 08/730,571, filed on Oct. 15, 1996, now abandoned, which is a continuation of application No. 08/277,690, filed on Jul. 20, 1994, now abandoned, which is a continuation of application No. 08/062,477, filed on May 11, 1993, now abandoned, which is a continuation of application No. 07/866,954, filed on Apr. 9, 1992, now abandoned, which is a continuation of application No. 07/572,814, filed on Aug. 24, 1990, now abandoned.

(30) Foreign Application Priority Data

Aug. 29, 1989 (DE) .......................................... 39 28 468

(51) Int. Cl.$^7$ ................................................. H01M 2/16
(52) U.S. Cl. ....................................... 429/249; 429/252
(58) Field of Search ................................ 429/249, 251, 429/252, 253, 254

(56) References Cited

U.S. PATENT DOCUMENTS 3,351,495 A * 11/1967 Larsen et al.

FOREIGN PATENT DOCUMENTS

GB 2 027 637 A * 2/1980

* cited by examiner

*Primary Examiner*—Carol Chaney
(74) *Attorney, Agent, or Firm*—Nields & Lemack

(57) ABSTRACT

An invention is described through which it is possible to reduce in quantity the coloured, mostly dark, and frequently adhesive deposits which form in lead accumulators with separators of filled poly-olefins during formation and operation. The essential feature is that the separators contain as plasticizer a process oil with a $C_A$ value of $\leq 6\%$, a sulphur content of $\leq 2000$ ppm and a polar part of $\leq 1\%$. Preferred process oils to be used as plasticizers are relatively naphthenic and naphthenic oils.

18 Claims, No Drawings

LEAD/SULPHURIC ACID-ACCUMULATOR, SEPARATOR FOR LEAD/SULPHURIC ACID ACCUMULATORS AND PROCESS TO REDUCE THE FORMATION OF COLORED DEPOSITS IN A LEAD/SULPHURIC ACID ACCUMULATORS

This application is a Continuation of U.S. Ser. No. 08/730,571 filed Oct. 15, 1996, now Abn, which is a Continuation of 08/277,690 filed Jul. 20, 1994, now Abn, Which is a Continuation of 08/062,477 filed May 11, 1993, now Abn, which is a Continuation of 07/866,954 filed Apr. 9, 1992, now Abn, which is a Continuation of 07/572,814 filed Aug. 24, 1990, now Abn.

BACKGROUND OF THE INVENTION

Lead/sulphuric acid-accumulators (for the sake of brevity referred to below as lead accumulators) contain to an over increasing extent separators made from filled poly-olefins. These separators are microporous separators, the composition and manufacture of which is known from the prior art (see, for example, DE-PS 1267 423, DE-PS 1298 712, DE-AS 1496 123, 35 40 718, DE-PS 36 17 318, DE-OS 30 04 659, GB-A 2, 027, 637, U.S. Pat. No. 3,351,495, U.S. Pat. No. 4, 024, 323 and U.S. Pat. No. 4, 237, 083). In contrast to separators based on impregnated cellulose paper, PVC or phenol-formaldehyde-resins, separators made from filled poly-olefins offer various advantages. On the one hand as a result of their favorable range of properties, the life duration and performance of lead accumulators can be improved, and on the other hand there are also advantages in the manufacture of the accumulator. The high flexibility of the separators made from filled poly-olefins allows fully automatic enveloping of lead plates and final sealing of the side edges, with result that the lead plates are protected in a separator pocket, closed on three sides.

However, in the use of separators made from filled poly-olefins in lead accumulators undesired processes are also observed. Through the interaction of the applied current, the constituents of the lead plates, the constituents of the battery acid and the constituents of the filled poly-olefin. separators, substances or substance mixtures form in the lead accumulator, which as a result of their low specific weight rise to the surface of the battery acid and there form mostly coloured and often also adhesive agglomerates, which tend to be deposited on the contact surfaces between the accumulator acid and the accumulator constituents, for example on the housing. Gases released in the charging process rise as bubbles in the acid, bursting on the surface of the acid thereby throwing acid and deposits upwards, which results in the cover, the cover opening, the cover-fastening possibly placed on it and the outside of the accumulator housing being covered with such deposits.

Housings for lead accumulators consist, for example, of polypropylene, methacrylate or polystyrene and are therefore transparent or totally clear. Coloured deposits forming when the lead Accumulator is in use deposit themselves on the inside of the containers and are therefore visible from the outside. As the deposits themselves are not transparent, an exact assessment of the acid level in the lead accumulator is prevented, thereby making the regular inspection and adjustment of the acid level in the accumulator more difficult. If insufficient water is added, the concentration of acid increases. At the same time the level of electrolyte can possibly sink so far that the lead plates partly protrude out of the acid and dry out.

Lead accumulators which, for example, are used for driving vehicles, are often fitted with a valve system for automatic water-addition. These lead accumulators are regularly connected to water reserve tank via valve system. When in proper working order the valve system ensures that a certain level of liquid is maintained in the lead accumulator. However, if this type of lead accumulator contains separators made of filled poly-olefins, then as described above, deposits form which can cause the water-addition system to be incapable of functioning. Consequently no water is added, and the acid level in the accumulator falls.

Many lead accumulators are fitted with gassing openings made from porous materials, which facilitate an unhindered escape of the gases formed in the accumulator and which prevent oxyhydrogen explosions by keeping sparks away from the gases. If this type of lead accumulator contains the filled poly-olefin separators described above, deposits can form when the lead accumulator is in use, as described, which can obstruct the de-gassing openings and thus make them impermeable to gases.

SUMMARY OF THE INVENTION

In view of the problems described above, the basis of the objective of the invention is to reduce the quantity of coloured, mostly dark and frequently adhesive deposits formed in lead accumulators with separators made from filled poly-olefins the use of a plasticizer with a low aromatic carbon content, low sulphur content and low polar constituent.

DETAILED DESCRIPTION OF THE INVENTION

To achieve this objective a lead/sulphuric acid accumulator with at least one separator made from filled poly-olefins is proposed which is characterized in that the separator contains as the plasticizer such as a process oil, having an aromatic carbon content, $C_A$ value, of $\leq 6\%$, a sulphur content $\leq 2000$ ppm and a polar part of $\leq 1.0\%$.

In addition, the subject of the invention is a separator made from filled poly-olefin for lead/sulphuric acid accumulators, which is characterized in that it contains as the plasticizer preferably a process oil, with a $C_A$ value of $\leq 6\%$, a sulphur content $\leq 2000$ ppm and a polar fraction of $\leq 1.0\%$.

Finally, the subject of the invention is a process for reducing the formation of coloured, mostly dark and frequently adhesive deposits in a lead/sulphuric acid accumulator with at least one separator made from filled poly-olefin, characterized in that separators are used in the accumulator which contain as the plasticizer a process oil with a $C_A$ value of $\leq 6\%$, a sulphur content $\leq 2000$ ppm and a polar port of $\leq 1.0\%$.

It was surprisingly found that a decisive reduction in the aforementioned deposits can be achieved by the use of process oils as plasticizers for separators made from filled poly-olefin, if the oils have a $C_A$ value according to DIN 51378 (without sulphur correction) of $\leq 6\%$, a total sulphur content measurable according to DIN 51400 of $\leq 2000$ ppm and a polar part according to ASTM D 20007-75 (polar compounds in % by weight) of $\leq 1.0\%$.

The mineral oils effective according to the invention are distinguised by the fact that they simultaneously meet the conditions $C_A \leq 6\%$, total sulphur content $\leq 2000$ ppm and polar part $\leq 1.0\%$. By their nature these oils can be not only relatively naphthenic, or naphthenic but also paraffinic, with the viscosity/density constant serving for classification (Ullmans Encyclopaedie der technischen Chemie, Verlag Chemis 1981, 4the edition, Volume 20, page 616). Relatively naphthenic oils with a visosity/density constant of 0.820–0.849 are most preferred, while paraffinic oils are least preferred. In the latter the $C_A$ value should be greater than 1% but $\leq 6$% and the sulphur content should be greater than 100 ppm and $\leq 2000$ ppm. Aromatic oils basically do not fulfil the condition of $C_A \leq 6$% and sulfur content $\leq 2000$ ppm and are therefore not considered for use according to the invention.

The process oils effective according to the invention preferably have a $C_A$ value of $\leq 5$%, and more preferred $\leq 3$% and particularly $\leq 2$%. The sulphur content of the process oils effective according to the invention is preferably $\leq 1000$ ppm, more preferred $\leq 500$ ppm and particularly $\leq 100$ ppm. The polar part in the process oils effective according to the invention is preferably $\leq 0.7$%, more preferred $\leq 0.5$% and particularly $\leq 0.3$%.

The plasticizer content of the separator according to the invention is within the normal boundaries. The plasticizer quantity based upon the finished separator weight is usually 1 to 40% by weight. Preferred plasticizer contents are 5 to 25% by weight and particularly 10 to 15% by weight. In addition to the highly refined process oils used according to the invention other usual plasticizers can also be used (see below).

Except for the process oils contained as plasticizers in the separators, the accumulator according the invention is a usual lead/sulphuric acid accumulator with conventional electrodes ie negative plates and positive plates and sulphuric acid as the electrolyte.

As already described in the prior art mentioned above, filled poly-olefin separators mainly contain polyethylene, where within the framework of the invention polyethylene of ultra-high molecular weight is preferred (average molecular weight of at least 1,000,000). However, polypropylene, polybutene, polystryene, ethylene-propylene co-polymers, ethylene-hexylene co-polymers, ethylene-butene co-polymers, propylene-butene co-polymers, lethylene-propylene-butene co-polymers, and co-polymers of ethylene or propylene with an ethylene unsaturated monocarbonic acid, such as acrylic acid, methacrylic acid or mixtures of these are sutiable. The prior art mentioned at the beginning can also be referred to with regard to fillers. A preferred filler according to the invention is silica ($SiO_2$).

Apart from the main constituents mentioned above the separators can also contain further usual constituents such as carbon black, anti-oxidants, lubricants, other fillers such as, for example, talcum etc. and possibly other polymers in more or less minor quantities. The materials forming the separators are carefully mixed in the usual manner and then formed, while heating, into a long length of material (generally known as foil). The, at least some of the, plasticizer is then extracted from this foil with an organic solvent in order to achieve the desired porosity. Finally, the separator material is cut into the separator sheets. The surfaces of the separators can be flat, ribbed or formed in other arbitrary ways. Such a separator and methods for making it are taught in U. S. 3,351,495 which is incorporated herein by reference.

The process oil used according to the invention can be introduced into the separator by adding it to the starting mixture and extracting the foil to leave a certain residual oil content. Another possibility is to use a plasticizer according to the invention or another plasticizer in the starting mixture, to extract this plasticizer completely or incompletely and to coat the free-lying surfaces of the battery separator with desired quantity of the plasticizer according to the invention. To accomplish this, the separator can, for example, be immersed in an oil/solvent solution and the solvent removed or the oil can be rolled or sprayed, either alone or with a diluent, on to the separator.

The process of complete extraction and refilling by immersion in an oil/solvent solution is termed "re-equilibration".

In addition to the substances suggested in the prior art many different types of oil are used or have been proposed as plasticizers. However, the aromatic hydrocarbon content, the sulphur content and the polar content are either not discussed or the proposed oils do not fulfill the conditions given above. For example, aromatic oils are proposed in DE-OS 30 04 659, while the Shellflex 411 named in U.S. Pat. No. 3,351,495 and DE-AS 1 496 123 has a $C_A$ value of 8% and the Shellflex 412 named in U.S. Pat. No. 4,024,323 has a polar part of 1.3%.

The use of the process oils according to the invention as plasticizers has also not previously been proposed in connection with the prevention of the coloured, mostly dark and often adhesive deposits observed when filled poly-olefin separators are used. This is extremely surprising in view of the severity of the problem of the formation of such deposits known as black scum or grey scum, and the widespread use of various process oils as plasticizers in separators, and shows that experts have obviously not taken the aromatic hydrocarbon part, the sulphur part and the polar part of the process oils used as plasticizers into consideration in solving the black scum problem.

The invention will be explained below by means of examples. Accumulator tests were carried out to evaluate the effectiveness of process oils as plasticizers. The sample accumulators used in these test consisted of cells which each had 5 positive and 4 negative plates, antimony content 2.5% by weight, with a total capacity of 36 Ah/cell. If not otherwise indicated the negative plates were separated with separator pockets of filled poly-olefins (total thickness 1.0 mm), which had been produced according to the process in U.S. Pat. No. 3,351, 495. The electrolyte was sulphuric acid in an amount of 400 ml/cell.

After the tests had been carried out, the cells were opened and the amount of coloured deposit on the cell boxes, cell covers and stoppers was evaluated by several persons, with 20 points given in the marking system for the heaviest deposits and 1 point given for the least deposits. An average was calculated from all the evaluations.

EXAMPLE 1

Separators made of filled polyethylene were extracted with hexane to constant weight and thus completely freed of oil. They were then re-equilibrated in the manner described above with the oils listed in Table 1. Accumulators according to the above description, which were each provided with four separator pockets, were subjected to the same electrical test. They were then opened and evaluated as described above. The results are also reproduced in Table 1.

EXAMPLE 2

Commercial separators presumably manufactured according to U.S. Pat. No. 4,024,323 (indicated as "commercial product" in Table 2) were re-equilibrated with the oils listed in Table 2 just as in Example 1. These separators were subjected, as in Example 1, to an electrical test to evaluate the amount of deposits. For comparison purposes both separators of filled polyethylene, manufactured with Shellflex 411 (oil 4) by extrusion and extraction to the desired residual oil content (indicated as "original" in Table 2), and re-equilibrated separators of filled polyethylene, were subjected in parallel to this procedure.

As can be appreciated from the results listed in Tables 1 and 2 separators made and/or re-equilibrated with an oil according to the present invention had significantly less amounts of deposits than those separators made and/or re-equilibrated with the known prior art oils.

While the present invention has been described in relation to its preferred embodiments, other equivalents, modifications, or variations can achieve the same result. Equivalents, modifications and variations of the present invention will be obvious to those skilled in the art and it is intended in the appended claims to cover all such modifications variations and equivalents as fall within the true spirit and scope of this invention.

What is claimed is:

1. In a lead/sulfuric acid accumulator having a series of positive plates and negative plates and one or more separators made from a microporous filled polyolefin and the one or more separators containing a process oil as a plasticizer, the process oil being selected from the group consisting of naphthenic oil, relatively naphthenic oil and paraffinic oil and containing an aromatic carbon, sulfur and polar part, the improvement consisting essentially of the process oil having an aromatic carbon value ($C_A$, according to DIN 51378, without sulfur correction) of $\leq 6\%$, sulphur content of $\leq 2000$ ppm and a polar part of $\leq 1\%$, with the proviso that in the case that said process oil is a paraffinic oil, said aromatic carbon value is more than 0.1% and said sulphur content is greater than 100 ppm.

2. In a separator for lead/sulfuric acid accumulators, the separator being formed of a foil of a microporous, filled polyolefin, the foil containing process oil, the process oil having an aromatic carbon value, a sulfur content and a polar part, the improvement consisting essentially of the process oil being selected from the group consisting essentially of relatively naphthenic mineral oils and paraffinic mineral oils having an aromatic carbon value of $\leq 6\%$, a sulphur content of $\leq 2000$ ppm and a polar part of $\leq 1.0\%$, with the proviso that in the case that said process oil is a paraffinic oil, said aromatic carbon value is more than 0.1% and said sulphur content is greater than 100 ppm.

3. In a separator for lead/acid accumulators, the separator being formed of a microporous foil of a poly-olefin filled with silica and process oil, the improvement comprising the process oil is a paraffinic oil having an aromatic carbon value ($C_A$) of >1% and $\leq 6\%$, a sulphur content of >100 ppm and $\leq 2000$ ppm and a polar part of $\leq 1.0\%$.

4. The accumulator according to claim 1, wherein the aromatic carbon value of the process oil is $\leq 5\%$.

5. The accumulator according to claim 1, wherein the sulphur content of the process oil is $\leq 1000$ ppm.

6. The accumulator according to claim 1, wherein the polar content of the process oil is $\leq 0.7\%$.

7. The accumulator according to claim 1, wherein the process oil is selected from the group consisting of naphthenic oil and relatively naphthenic oil.

8. The accumulator according to claim 1, wherein the separator contains 1 to 40% by weight of process oil as plasticizer.

9. The accumulator according to claim 1, wherein the separator also contains one or more plasticizers.

10. The accumulator according to claim 1, wherein the separator consists of filled polyethylene of ultra-high molecular weight and is essentially filled with silica.

11. The separator according to claim 2, wherein the process oil has a $C_A$ value of $\leq 5\%$.

12. The separator according to claim 2, wherein the sulphur content of the process oil is $\leq 1000$ ppm.

13. The separator according to claim 2, wherein the polar content of the process oil is $\leq 0.7\%$.

14. The separator according to claim 2, wherein the process oil is selected from the group consisting of naphthenic oil and relatively naphthenic oil.

15. The separator according to claim 2, wherein the process oil is a paraffinic oil and has an aromatic carbon value of more than 0.5%.

16. The separator according to claim 2, wherein the separator contains 1 to 40% by weight of plasticizer.

17. The separator according to claim 2, further comprising the separator containing in addition one or more plasticizers.

18. The separator according to claim 2, wherein the separator consists of filled polyethylene of ultra-high molecular weight and is essentially filled with silica and plasticizer.

* * * * *